(No Model.)
A. N. & A. FREE.
PNEUMATIC TIRE ARMOR.
No. 583,145. Patented May 25, 1897.
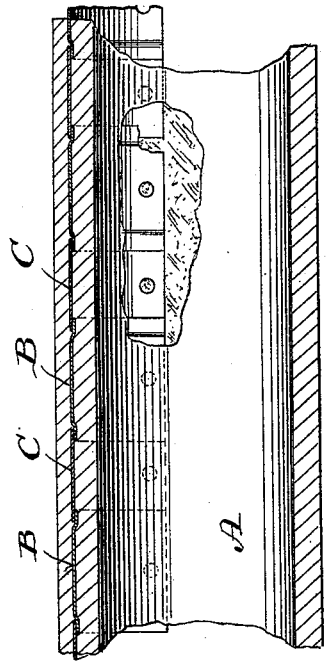
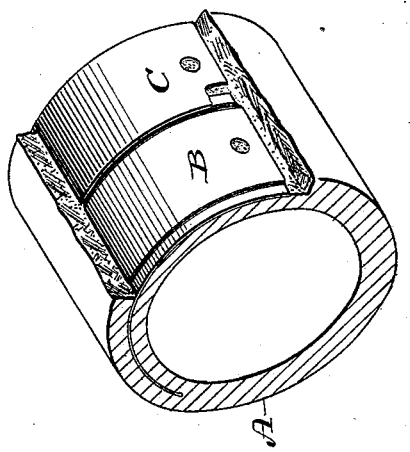
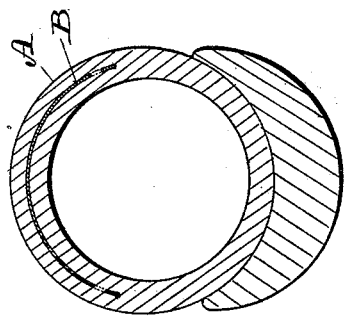
Witnesses:
Geo. W. Young
N. E. Oliphant
Inventors:
Allison N. Free
Alfred Free
H. G. Underwood
Attorney

United States Patent Office.

ALLISON N. FREE AND ALFRED FREE, OF MILWAUKEE, WISCONSIN.

PNEUMATIC-TIRE ARMOR.

SPECIFICATION forming part of Letters Patent No. 583,145, dated May 25, 1897.

Application filed February 3, 1896. Serial No. 577,806. (No model.)

*To all whom it may concern:*

Be it known that we, ALLISON N. FREE and ALFRED FREE, citizens of the United States, and residents of Milwaukee, in the county of Milwaukee and State of Wisconsin, have invented certain new and useful Improvements in Pneumatic-Tire Armor; and we do hereby declare that the following is a full, clear, and exact description thereof.

The invention has for its object to render pneumatic tires puncture-proof; and it consists in a peculiar armor for such a tire, as well as the latter provided with said armor, as is hereinafter more fully set forth with reference to the accompanying drawings and subsequently claimed.

In the drawings, Figure 1 represents a transverse section of a pneumatic tire in place upon a wheel-rim and provided with a puncture-proof armor according to our invention; Fig. 2, a longitudinal section of a portion of said tire, some of which is broken away to show the puncture-proof armor embedded therein; and Fig. 3, a perspective view of a portion of the aforesaid tire broken away to expose said puncture-proof armor.

Referring by letter to the drawings, A represents a pneumatic tire of the so-called "hose-pipe" variety, although our invention is applicable to pneumatic tires comprising an air-tube and a sheath for the same.

Embedded in the tread portion of the tire is an armor comprising a series of scales B C, that are lapped upon each other throughout the circumference of said tire, these scales being of any suitable hard material, preferably thin spring-steel, and are arc-shape to conform with the contour of the aforesaid tire in a transverse direction. The scales C have uninterrupted surfaces and alternate with the ones B, the latter having depressed edges constituting seats for the ones aforesaid, the depth of the seats being such that the outer faces of all the scales are practically on the same circle. The scales C are also shown of such length and disposition as to permit flexure of the armor under the various conditions to which a tire provided with the same is subjected. In other words, space is left between edges of scales C and the opposing surfaces of the scales B alternating therewith.

The ends of the scales B C are shown provided with openings through which the rubber ordinarily employed in the manufacture of a pneumatic tire may penetrate while in a plastic state and which binds said scales in working position when vulcanization is effected. It is also practical to arrange the armor on the exterior of a pneumatic tire, and in any case the ends and edges of the scales are rounded or otherwise made blunt to prevent chafing or cutting the tire material.

The armor may be made up and sold as a sundry to manufacturers of pneumatic tires, and therefore it constitutes a merchantable commodity independent of said tires, although combining with the same.

Having thus described our invention, what we claim as new, and desire to secure by Letters Patent, is—

1. A puncture-proof armor for a pneumatic tire, the same comprising two series of arc-shaped scales of suitable hard material, one series having depressed edges forming angular seats and the other having uninterrupted surfaces, the scales of the latter series being alternate with those of the former series and seated in the depressions of the same, to thereby have the outer faces of all the scales flush with each other around the circumference of the tire.

2. A puncture-proof armor for a pneumatic tire, the same comprising two series of perforated arc-shaped scales of suitable hard material, one series having depressed edges forming angular seats and the other having uninterrupted surfaces, the scales of the latter series being alternate with those of the former series and seated in the depressions of the same, to thereby have the outer faces of all the scales flush with each other around the circumference of the tire.

In testimony that we claim the foregoing we have hereunto set our hands, at Milwaukee, in the county of Milwaukee and State of Wisconsin, in the presence of two witnesses.

ALLISON N. FREE.
ALFRED FREE.

Witnesses:
N. E. OLIPHANT,
B. C. ROLOFF.